(12) United States Patent
Alqadami et al.

(10) Patent No.: US 10,245,576 B1
(45) Date of Patent: Apr. 2, 2019

(54) MAGNETIC POLYMER NANOCOMPOSITE FOR REMOVAL OF DIVALENT HEAVY METAL IONS FROM WATER

(71) Applicant: KING SAUD UNIVERSITY, Riyadh (SA)

(72) Inventors: Ayoub Abdullah Alqadami, Riyadh (SA); Moonis Ali Khan, Riyadh (SA); Zeid Abdullah Alothman, Riyadh (SA); Ibrahim Hotan Alsohaimi, Aliouf (SA); Masoom Raza Siddiqui, Riyadh (SA); Ayman A. Ghfar, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/137,472

(22) Filed: Sep. 20, 2018

(51) Int. Cl.
*B01J 20/06* (2006.01)
*B01J 20/26* (2006.01)
(Continued)

(52) U.S. Cl.
CPC ............. *B01J 20/261* (2013.01); *B01J 20/06* (2013.01); *B01J 20/28009* (2013.01); *B01J 20/28033* (2013.01); *B01J 20/3085* (2013.01); *B01J 20/3425* (2013.01); *B01J 20/3475* (2013.01); *C02F 1/288* (2013.01); *C02F 1/488* (2013.01); *C02F 1/66* (2013.01); *H01F 1/42* (2013.01); *C02F 1/281* (2013.01); *C02F 1/285* (2013.01); *C02F 2101/20* (2013.01); *C02F 2303/16* (2013.01); *C02F 2305/08* (2013.01)

(58) Field of Classification Search
CPC .................................................... B01J 20/261
See application file for complete search history.

(56) References Cited

U.S. PATENT DOCUMENTS

| 6,896,815 B2 | 5/2005 | Cort |
| 7,255,793 B2 | 8/2007 | Cort |
| (Continued) | | |

FOREIGN PATENT DOCUMENTS

| CN | 101244884 A | 8/2000 |
| CN | 101254976 B | 4/2011 |
| (Continued) | | |

OTHER PUBLICATIONS

Liao et al., "Preparation and characterization of a novel magnetic nano-adsorbent", J. Mater. Chem. (2002), vol. 12, pp. 3654-3659.
(Continued)

*Primary Examiner* — Peter Keyworth
(74) *Attorney, Agent, or Firm* — Richard C. Litman (57) ABSTRACT

The magnetic polymer nanocomposite for removal of divalent heavy metal ions from water is magnetic nanocomposite having a core of magnetite ($Fe_3O_4$) in a shell of branched polyhydroxystyrene (BHPS), designated as $Fe_3O_4$@BHPS. The nanocomposite is synthesized by co-precipitation in alkali solution. Testing showed the nanocomposite reached 93% and 80% Pb(II) and Cd(II) adsorption, respectively, in 30 minutes, attaining equilibrium in 120 minutes. The maximum adsorption capacities of Pb(II) and Cd(II) at 298K were 186.2 and 125 mg/g, respectively. After adsorption, the nanocomposite with the heavy metal(s) adsorbed thereto was easily removed from aqueous solution by application of a magnetic field.

5 Claims, 9 Drawing Sheets

(51) Int. Cl.
  *B01J 20/28* (2006.01)
  *B01J 20/34* (2006.01)
  *B01J 20/30* (2006.01)
  *H01F 1/42* (2006.01)
  *C02F 1/66* (2006.01)
  *C02F 1/28* (2006.01)
  *C02F 1/48* (2006.01)
  *C02F 101/20* (2006.01)

(56) References Cited

U.S. PATENT DOCUMENTS

| 7,291,578 B2 | 11/2007 | SenGupta et al. |
| 2008/0035564 A1 | 2/2008 | Moller et al. |
| 2011/0118533 A1 | 5/2011 | Hawkett et al. |

FOREIGN PATENT DOCUMENTS

| JP | 5455545 B2 | 3/2014 |
| RU | 2431472 C2 | 10/2011 |
| WO | 0034404 A1 | 6/2000 |

OTHER PUBLICATIONS

Zhou et al., "Fe3O4@polydopamine and derived Fe3O4@carbon core-shell nanoparticles: Comparison in adsorption for cationic and anionic dyes", Colloids and Surfaces A:Physicochem. and Eng. Aspects 522 (2017), pp. 260-265.

MAGNETIC POLYMER NANOCOMPOSITE FOR REMOVAL OF DIVALENT HEAVY METAL IONS FROM WATER

BACKGROUND

1. Field

The disclosure of the present patent application relates to magnetic nanocomposite material, and particularly to a magnetic polymer nanocomposite for removal of divalent heavy metal ions, such as lead and cadmium, from water.

2. Description of the Related Art

Rapid industrialization and population growth drive an increasing need for, and threaten the fate of, clean water availability. Environmental protocols in many developed countries have changed to sustain the environment and conserve water reservoir quality. Among potential water contaminants, heavy metals are of foremost concern, as they are persistent, potentially toxic and carcinogenic, even in trace amounts. Therefore, monitoring and controlling heavy metal concentrations in waste streams before discharge to surface and subsurface water is essential.

Diverse water treatment technologies (for example, chemical precipitation, electro-deposition, ultra-filtration, ion-exchange, adsorption and biological processes) have been engineered to remove heavy metals present in water. Operational ease, cost-effectiveness and applicability, even at very low adsorbate concentrations, make adsorption a highly acclaimed water remediation technique. Advancements in nanotechnology have opened many new avenues in the development of nanosized adsorbents. The large surface area to volume ratio and high adsorption efficiency of nanoadsorbents make them strong competitors to conventional adsorbents for use in water purification. However, while nanoadsorbents are potentially effective water remediation agents, their small particle size presents practical obstacles, such as difficulty separating saturated nanoadsorbents from unsaturated nanoadsorbents or the aquatic milieu being treated, restricting their utility in water treatment applications.

Magnetic separation processes were introduced in the early 1990's to address such phase separation issues, and have since gained considerable attention. During magnetization separation, nanoadsorbent particles are embedded, encapsulated or coated with metal oxides (for example, magnetite, $Fe_3O_4$) to introduce magnetic properties.

Unexplored in the context of magnetic separation processes and related materials, branched polyhydroxystyrene (BPHS), a derivative of hydroxystyrene, is widely used in HPLC columns as an organic waste adsorbent, and in selectively permeable membranes.

Thus, a magnetic polymer nanocomposite for the removal of divalent heavy metal ions from water solving the aforementioned problems is desired.

SUMMARY

The magnetic polymer nanocomposite for removal of divalent heavy metal ions from water is a magnetic nanocomposite having a core of magnetite ($Fe_3O_4$) in a shell of branched polyhydroxystyrene (BHPS), designated as $Fe_3O_4$@BHPS. The nanocomposite is synthesized by co-precipitation in alkali solution. Testing showed the nanocomposite reached 93% and 80% Pb(II) and Cd(II) adsorption, respectively, in 30 minutes, attaining equilibrium in 120 minutes. The maximum adsorption capacities of Pb(II) and Cd(II) at 298K were 186.2 and 125 mg/g, respectively. After adsorption, the nanocomposite with the heavy metal(s) adsorbed thereto was easily removed from aqueous solution by application of a magnetic field.

A method of removing a divalent heavy metal ions from aqueous solutions includes the steps of: (a) adding a magnetic polymer nanocomposite having a magnetite core and a branched polyhydroxystyrene shell ($Fe_3O_4$@BPHS) to an aqueous solution contaminated with a divalent heavy metal ions; (b) leaving the magnetic polymer nanocomposite in the aqueous solution for a period of time sufficient to saturate the magnetic polymer nanocomposite with the divalent heavy metal ions adsorbed on the nanocomposite; and (c) removing the saturated magnetic polymer nanocomposite from the aqueous solution by applying an external magnetic field. The method may further include the steps of: (d) eluting the magnetic polymer nanocomposite having the divalent heavy metal ions adsorbed thereon with a dilute solution of a strong acid in order to desorb the divalent heavy metal ions from the magnetic polymer nanocomposite; and (e) applying an external magnetic field to recover the magnetic polymer nanocomposite free from adsorbed divalent heavy metal ions for re-use.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The magnetic polymer nanocomposite for removal of divalent heavy metal ions from water is magnetic nanocomposite having a core of magnetite ($Fe_3O_4$) in a shell of branched polyhydroxystyrene (BHPS), designated as $Fe_3O_4$@BHPS. The nanocomposite is synthesized by co-precipitation in alkali solution. Testing showed the nanocomposite reached 93% and 80% Pb(II) and Cd(II) adsorption, respectively, in 30 minutes, attaining equilibrium in 120 minutes. The maximum adsorption capacities of Pb(II) and Cd(II) at 298K were 186.2 and 125 mg/g, respectively. After adsorption, the nanocomposite with the heavy metal(s) adsorbed thereto was easily removed from aqueous solution by application of a magnetic field.

A method of removing a divalent heavy metal ions from aqueous solutions includes the steps of: (a) adding a magnetic polymer nanocomposite having a magnetite core and a branched polyhydroxystyrene shell ($Fe_3O_4$@BPHS) to an aqueous solution contaminated with a divalent heavy metal ions; (b) leaving the magnetic polymer nanocomposite in the aqueous solution for a period of time sufficient to saturate the magnetic polymer nanocomposite with the divalent heavy metal ions adsorbed on the nanocomposite; and (c) removing the saturated magnetic polymer nanocomposite from the aqueous solution by applying an external magnetic field. The method may further include the steps of: (d) eluting the magnetic polymer nanocomposite having the divalent heavy metal ions adsorbed thereon with a dilute solution of a strong acid in order to desorb the divalent heavy metal ions from the magnetic polymer nanocomposite; and (e) applying an external magnetic field to recover the magnetic polymer nanocomposite free from adsorbed divalent heavy metal ions for re-use.

The magnetic polymer nanocomposite for removal of divalent heavy metal ions from water will be better understood with reference to the following examples.

Example 1

Synthesis of Magnetic Polymer Nanocomposite ($Fe_3O_4$@BPHS)

In an exemplary synthesis, 2.36 g ferric chloride hexahydrate ($FeCl_3 \cdot 6H_2O$) was dissolved in 100 mL 0.5M HCl solution in a 250 mL Erlenmeyer flask. In another 250 mL Erlenmeyer flask, 0.86 g ferrous chloride ($FeCl_2 \cdot 4H_2O$) was dissolved in 100 mL 0.5M HCl solution under $N_2$ gas flow for 20 min to prevent the oxidation of Fe(II). Then, the two solutions were mixed in a three-necked round bottom flask equipped with a mechanical stirrer at 80° C. under $N_2$ gas flow to form a reaction mixture. After mixing, 0.5 g of branched polyhydroxystyrene (BPHS), in powder form, was dissolved in 30 mL methanol ($CH_3OH$), and the methanolic BPHS solution was added dropwise, together with 20 mL of 28% $NH_4OH$ solution, to the reaction mixture under rigorous mechanical stirring (1000 rpm) for a period of 30 min until the pH of the reaction mixture reached around 10. The reaction mixture was then stirred for another 4 hrs under $N_2$ atmosphere. Finally, a resulting black colloidal product was separated from the reaction mixture by application of an external magnetic field, and washed with deionized water and methanol to remove unreacted BPHS and other impurities. The precipitate was dried at room temperature over a watch glass for 48 hrs to obtain BPHS impregnated with magnetite nanoparticles, i.e., $Fe_3O_4$@BPHS. The synthesis scheme is shown diagrammatically in FIG. 1.

Figure 3:
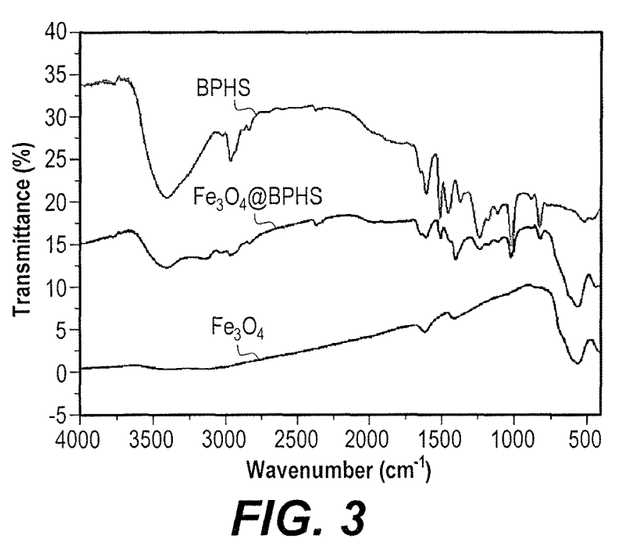
FIG. 3 is a composite of the Fourier transform infrared spectroscopy (FTIR) spectra of the intermediate products, viz., magnetite ($Fe_3O_4$) and branched polyhydroxystyrene (BPHS), and the product magnetic polymer nanocomposite of the reaction shown in FIG. 1.

The resulting product was characterized by Fourier transform infrared spectroscopy (FTIR), the spectra of the reactants and the products being compared in FIG. 3. In the spectrum of BPHS, a broad absorption peak is observed at around 3407 $cm^{-1}$ (presumably stretching of —OH); 3022 $cm^{-1}$ (presumably stretching of Ar—C—H); 2963 $cm^{-1}$ and 2831 $cm^{-1}$ (presumably asymmetric and symmetric stretching of —C—H, respectively); 1604 $cm^{-1}$ (stretching Ar—C═C); 1507, 1448, and 1237 $cm^{-1}$ (bending —OH, and —C—O). In the spectrum of $Fe_3O_4$@BPHS nanocomposite, 572 $cm^{-1}$ (Fe—O); 3398 $cm^{-1}$ (stretching —OH); 3033 (stretching Ar—C—H); 2936 $cm^{-1}$ and 2838 (asymmetric and symmetric stretching —C—H, respectively); 1603 (stretching Ar—C═C), 1514, 1398, and 1220 $cm^{-1}$ (bending —OH, and —C—O).

Figure 4:
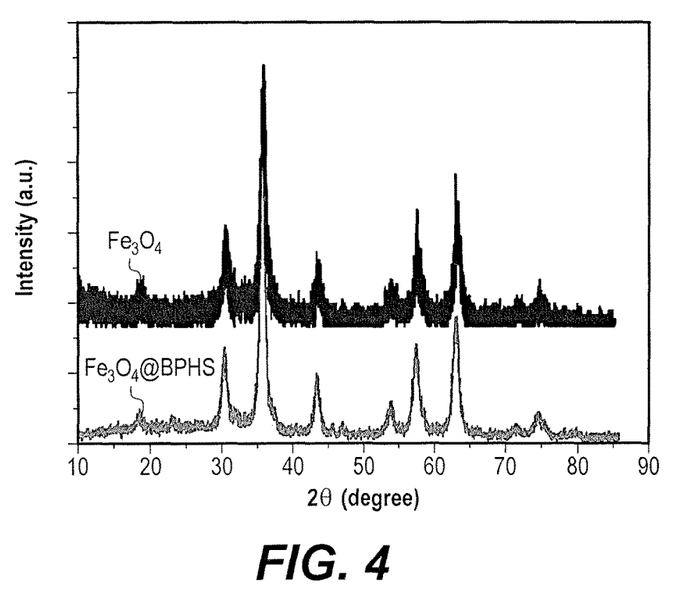
FIG. 4 is a plot of the X-ray diffraction (XRD) patterns of $Fe_3O_4$ and the magnetic polymer nanocomposite, $Fe_3O_4$@BHPS.

The resulting product was also characterized by X-ray diffraction (XRD) the magnetite and the final product patterns being compared in FIG. 4. Observed characteristic peaks at 2θ=18.33°, 30.2°, 35.3°, 43.2°, 53.5°, 57.3°, 63.2° and 74.9° correspond to (111), (220), (311), (400), (422), (511), (440) and (533) indices, respectively, consistent with standard results for $Fe_3O_4$ in the Joint Committee on Powder Diffraction Standards database (JCPDS, file 19-0629), confirming the cubic spinel structure of pure $Fe_3O_4$. XRD results for $Fe_3O_4$@BPHS were qualitatively similar to those of $Fe_3O_4$, with no new peaks observed.

The crystal sizes of $Fe_3O_4$ and $Fe_3O_4$@BPHS were determined from their respective XRD patterns by using Debye-Scherrer's equation, provided as equation (1):

$$D_S = K \times \frac{\lambda}{(\beta \cos \theta)}, \quad (1)$$

where θ is the Bragg's peak, β is the half-width of the diffraction peak, K is a constant that depends on the crystallite's morphology, and λ is the X-ray wavelength, assumed to be 0.154 nm. The (311) peak of the highest intensity was picked out to evaluate the crystal size. The crystallite sizes of $Fe_3O_4$ and $Fe_3O_4$@BPHS were found to be 11.8 and 14.5 nm, respectively.

Figure 5A:
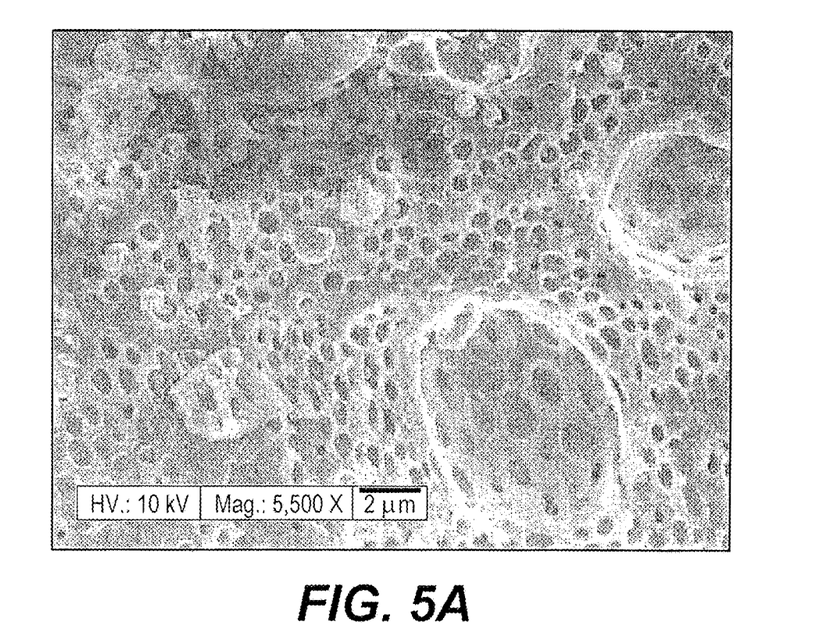
FIG. 5A is a scanning electron micrograph (SEM) of branched polyhydroxystyrene (BPHS)
Figure 5B:
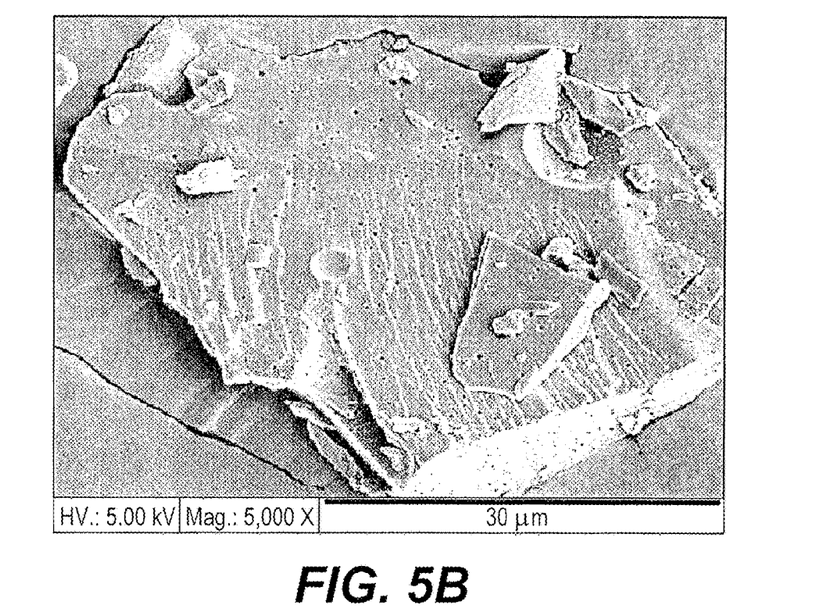
FIG. 5B is a SEM micrograph of the magnetic polymer nanocomposite.

In addition, the resulting product was also characterized by SEM microscopy, FIGS. 5A and 5B comparing the BPHS reactant with the $Fe_3O_4$@BPHS product. A highly porous and uneven BPHS surface with no uniform sized pores was observed, as shown in FIG. 5A. FIG. 5B shows the $Fe_3O_4$@BPHS appears to take the form of a BPHS sheet impregnated with magnetite nanoparticles.

Figure 7:
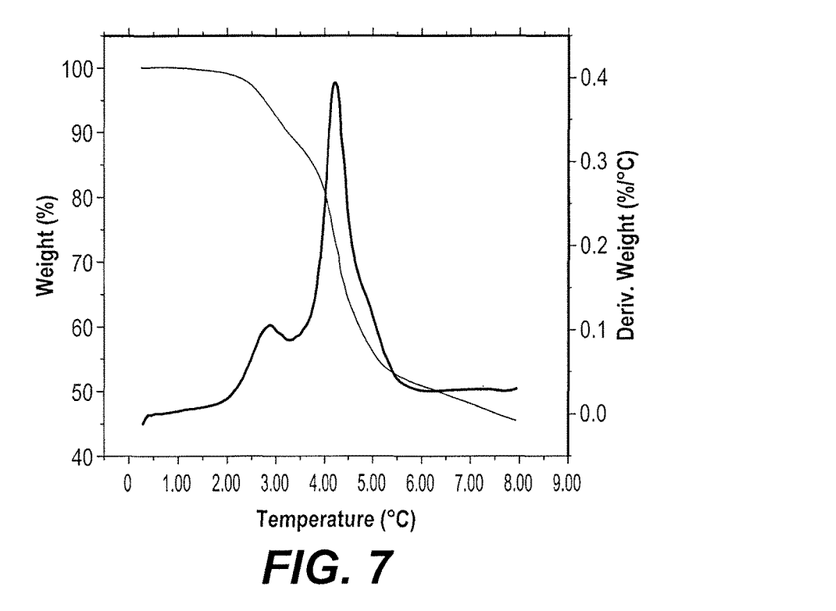
FIG. 7 is a thermogravimetric analysis (TGA)/differential thermal analysis (DTA) plot of the magnetic polymer nanocomposite.

Finally, the resulting product was characterized by thermogravimetric analysis (TGA)/differential thermal analysis (DTA), a plot of the product being shown in FIG. 7. A two-step weight loss within the temperature range 30-800° C. was observed. The first-step shows 6% weight loss due to the loss of physically absorbed water molecules, observed in the temperature range 30-280° C. The second-step shows 37% weight loss due to decomposition of the BPHS polymer component of the $Fe_3O_4$@BHPS, and was observed within a temperature range of 325-550° C.

The surface area, pore volume and pore size of the exemplary $Fe_3O_4$@BHPS were determined through adsorption of nitrogen ($N_2$) gas at 77 K using a Micromeritics Surface Area and Porosity analyzer (Gemini VII, 2390 Surface Area and Porosity analyzer). Prior to BET surface area measurement, the sample was degassed at 150° C. for 2 h. The surface area analysis of the exemplary $Fe_3O_4$@BPHS showed a Brunauer-Emmett-Teller (BET) surface area of 41.8 $m^2/g$ and an average pore diameter of 1.9 nm.

Example 2

Adsorption Experiments and Results

Batch mode lead [Pb(II)] and cadmium [Cd(II)] adsorption experiments were carried out to test the efficacy of the $Fe_3O_4$@BPHS, synthesized as described in Example 1, as an adsorbent. In a 100 mL Erlenmeyer flask, 25 mL Pb(II) aqueous solution having an initial concentration ($C_o$) of 25 mg/L was equilibrated with 0.015 g $Fe_3O_4$@BPHS over a thermostatic shaking assembly at 100 rpm operated at room temperature. At equilibrium, the saturated $Fe_3O_4$@BPHS nanocomposite was separated from the aqueous phase by an external magnetic field and the residual Pb(II) concentration was quantitatively determined by atomic adsorption spectrophotometry (AAS). Experimental parameters of pH, contact time, $C_o$ and temperature were varied. Similar batch mode adsorption experiments were conducted for Cd(II).

The amount ($q_e$, mg/g) and percentage (%) of Pb(II) and Cd(II) adsorption were calculated according to equation (2) and equation (3), respectively, as follows:

$$q_e, \text{mg/g} = (C_o - C_e) \times \frac{V}{m} \quad (2)$$

$$\% \text{ adsorption} = \frac{C_o - C_e}{C_o} \times 100, \quad (3)$$

where V is the volume of adsorbate solution (in L), m is the mass of $Fe_3O_4$@BPHS added (in g), and $C_o$ and $C_e$ (in mg/L) are the initial and equilibrium concentrations of Pb(II) or Cd(II) ions in solution, respectively.

Figure 1:
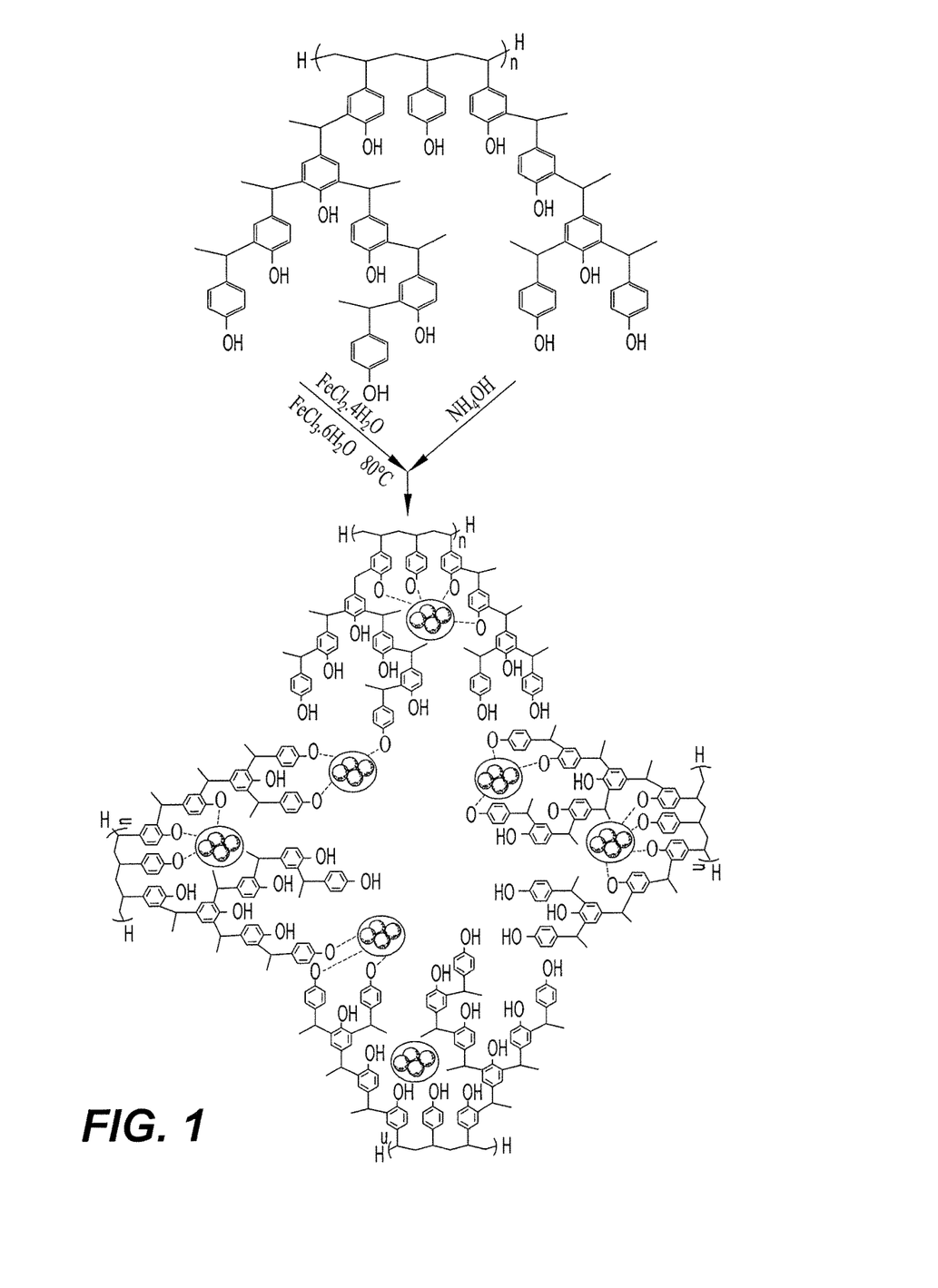
FIG. 1 is a reaction scheme for the synthesis of a magnetic polymer nanocomposite for removal of divalent heavy metal ions from water.
Figure 2:
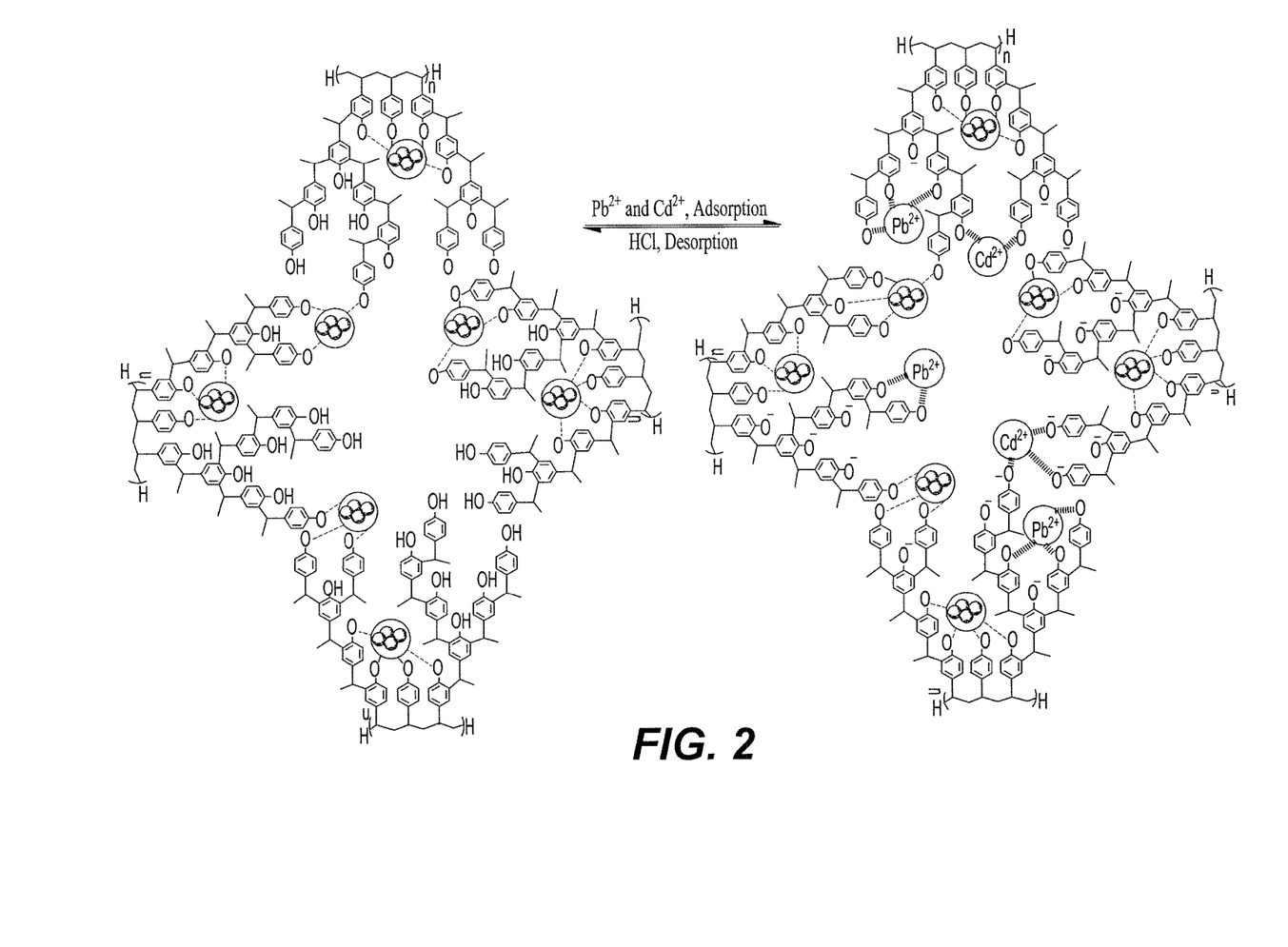
FIG. 2 is a reaction scheme diagrammatically showing the adsorption of lead [Pb(II)] and cadmium [Cd(II)] ions by the magnetic polymer nanocomposite synthesized in FIG. 1.
Figure 6A:
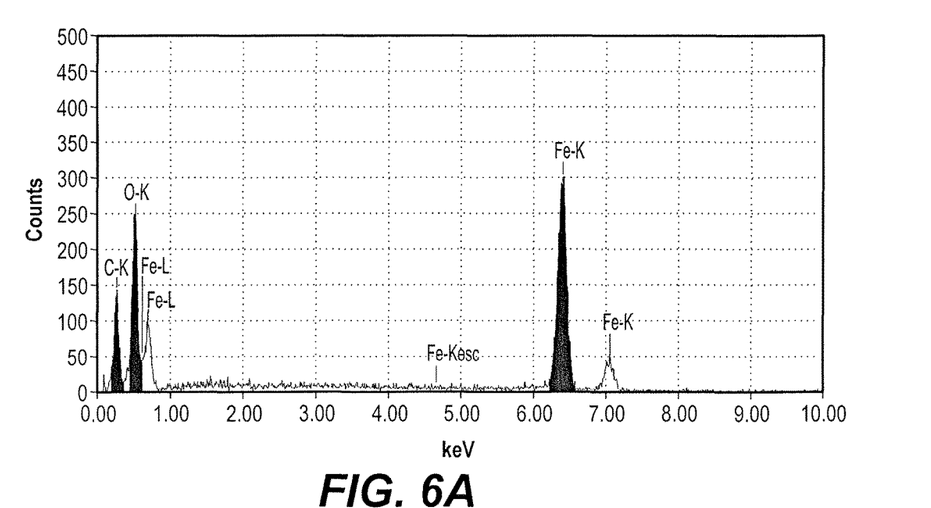
FIG. 6A is an energy dispersive X-ray (EDX) plot of the magnetic polymer nanocomposite.
Figure 6B:
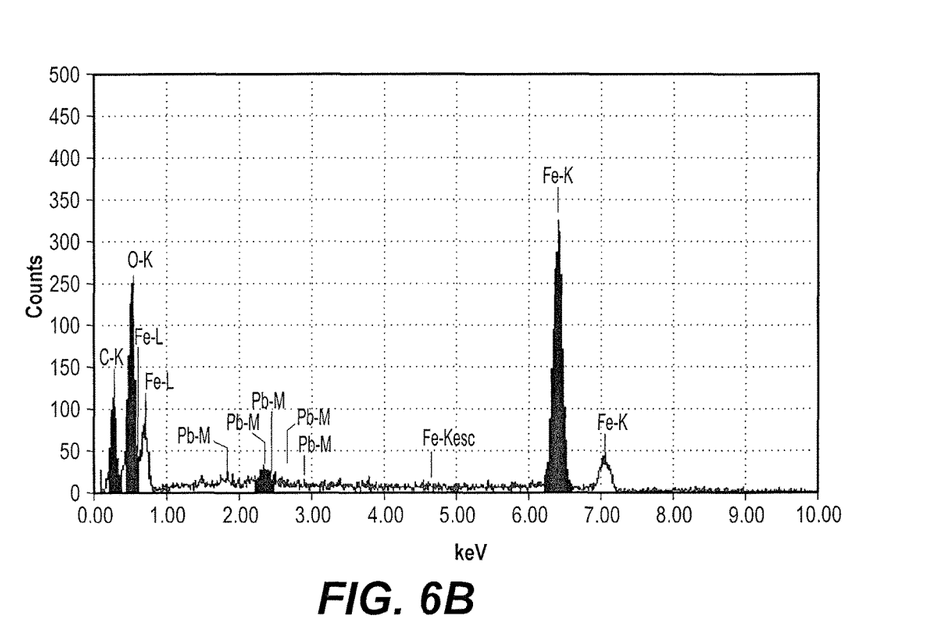
FIG. 6B is an energy dispersive X-ray (EDX) plot magnetic polymer nanocomposite after Pb(II) adsorption.
Figure 6C:
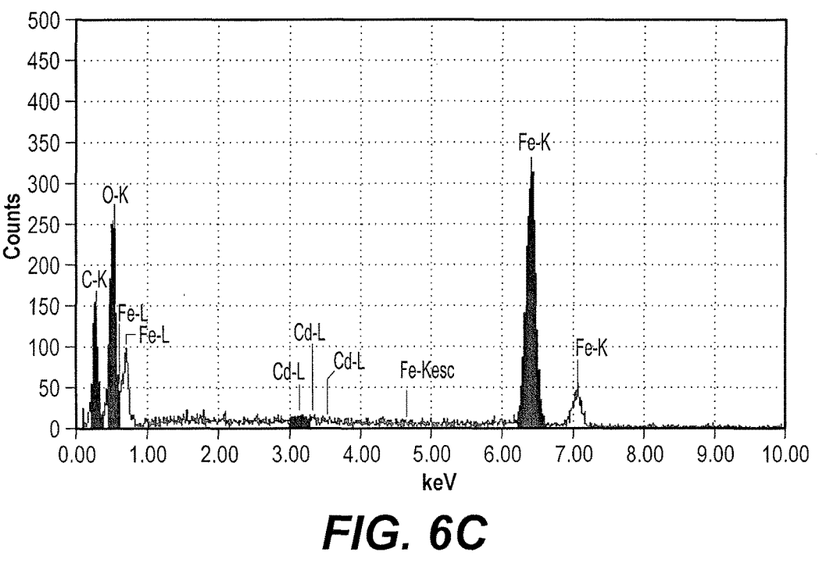
FIG. 6C is an energy dispersive X-ray (EDX) plot of the magnetic polymer nanocomposite after Cd(II) adsorption.

FIG. 2 is a reaction scheme diagrammatically showing the adsorption of lead [Pb(II)] and cadmium [Cd(II)] ions by the magnetic polymer nanocomposite synthesized in FIG. 1. FIG. 6A is an energy dispersive X-ray (EDX) plot of the magnetic polymer nanocomposite; FIG. 6B is an energy dispersive X-ray (EDX) plot magnetic polymer nanocomposite after Pb(II) adsorption; and FIG. 6C is an energy dispersive X-ray (EDX) plot of the magnetic polymer nanocomposite after Cd(II) adsorption. FIG. 6A shows C, O and Fe present in pristine $Fe_3O_4$@BPHS. FIGS. 6B and 6C show the presence of Pb(II) and Cd(II) in the $Fe_3O_4$@BPHS following adsorption experiments, respectively, confirming binding of the adsorbed heavy metals to $Fe_3O_4$@BPHS surface.

Figure 8A:
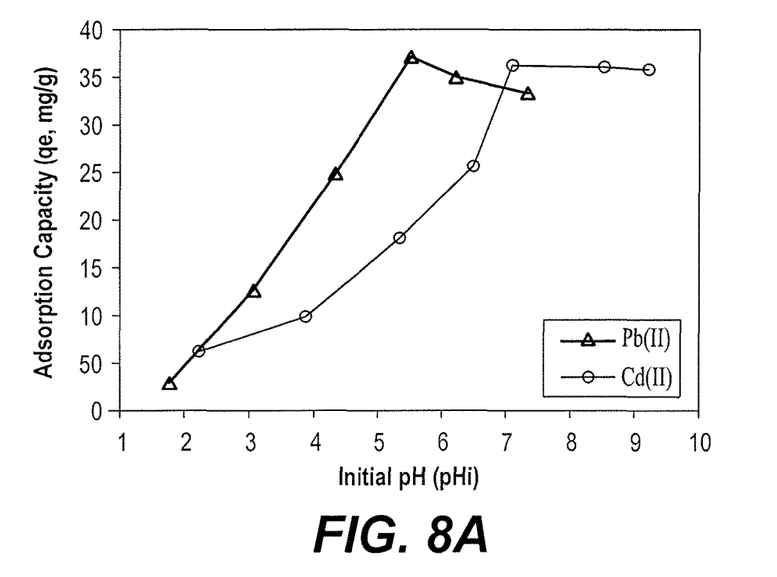
FIG. 8A is a composite plot showing adsorption capacity as a function of initial pH for the adsorption of Pb(II) and Cd(II) by the magnetic polymer nanocomposite.
Figure 8B:
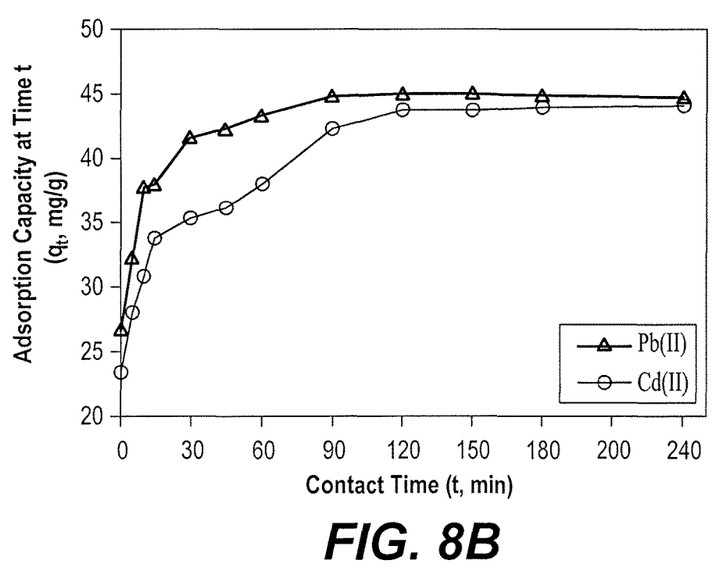
FIG. 8B is a composite plot showing adsorption capacity as a function of contact time for the adsorption of Pb(II) and Cd(II) by the magnetic polymer nanocomposite.
Figure 8C:
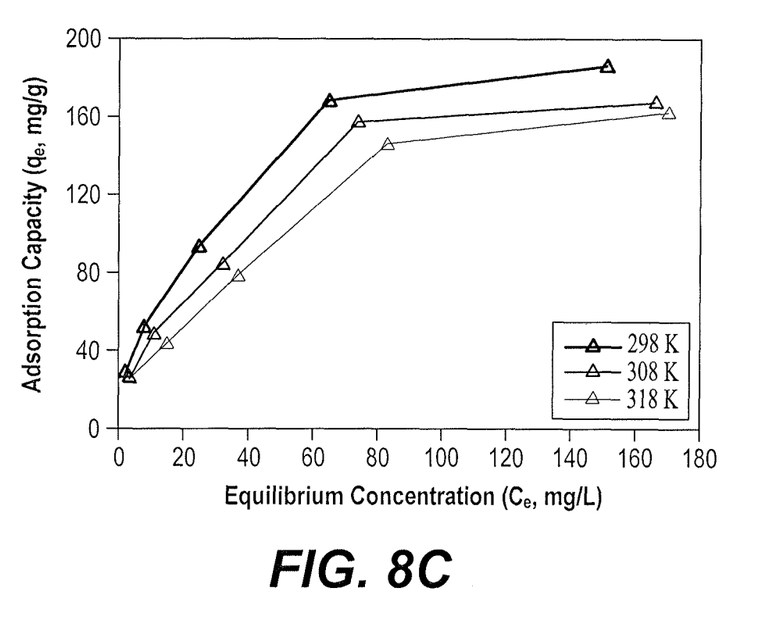
FIG. 8C is a composite plot showing adsorption capacity as a function of equilibrium concentration for the adsorption of Pb(II) by the magnetic polymer nanocomposite at different temperatures.
Figure 8D:
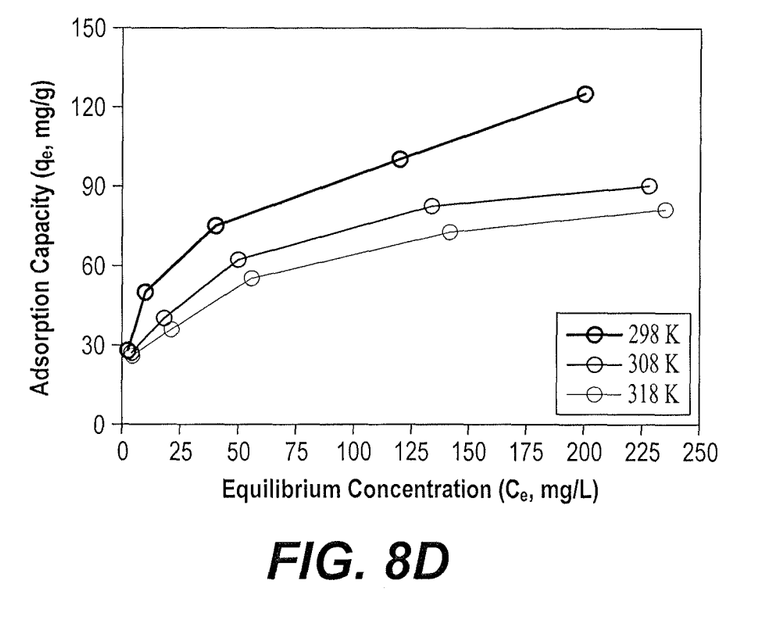
FIG. 8D is a composite plot showing adsorption capacity as a function of equilibrium concentration for the adsorption of Cd(II) by the magnetic polymer nanocomposite at different temperatures.

FIG. 8A is a composite plot showing adsorption capacity as a function of initial pH for the adsorption of Pb(II) and Cd(II) by the magnetic polymer nanocomposite. Maximal Pb(II) and Cd(II) ion adsorption on the $Fe_3O_4$@BPHS nanocomposite was achieved for initial pH ($pH_i$) values above 4 and 6, respectively; preferably between 5-7 and 6.5-9, respectively; and more preferably around 5.5 and 7.1, respectively. FIG. 8B is a composite plot showing adsorption capacity as a function of contact time for the adsorption of Pb(II) and Cd(II) by the magnetic polymer nanocomposite. The equilibration times for Pb(II) and Cd(II) ions adsorption on the $Fe_3O_4$@BPHS, i.e., the times for saturation, were at least 30 and 90 minutes, respectively; and preferably at least 90 and 120 min, respectively. FIG. 8C is a composite plot showing adsorption capacity as a function of equilibrium concentration for the adsorption of Pb(II) by the magnetic polymer nanocomposite at different temperatures. FIG. 8D is a composite plot showing adsorption capacity as a function of equilibrium concentration for the adsorption of Cd(II) by the magnetic polymer nanocomposite at different temperatures. The adsorption of Pb(II) and Cd(II) ions onto $Fe_3O_4$@BPHS was found to slightly decrease with increasing temperature over the range from 298-318K. The maximum capacity for Pb(II) and Cd(II) ion adsorption onto $Fe_3O_4$@BPHS was measured in the present exemplary experiments to be 186.2 mg/g and 125 mg/g, respectively at 298 K.

Table 1 is the isotherm data for the adsorption of Pb(II) and Cd(II) on the magnetic polymer nanocomposite, $Fe_3O_4$@BPHS synthesized in Example 1.

Table 2 is the kinetic data for the adsorption of Pb(II) and Cd(II) on the magnetic polymer nanocomposite, Fe3O4@BPHS when $C_o$=25 mg/L.

TABLE 1

Isotherm data for adsorption of Pb(II) and Cd(II)

| | | Isotherm models | | | | | | |
|---|---|---|---|---|---|---|---|---|
| | | Langmuir | | | | Freundlich | | |
| Metal ions | Temperature (K) | $q_m$ (mg/g) | b (L/mg) | $R_L$ | $R^2$ | $K_F$ (mg/g)(L/mg)$^{1/n}$ | n | $R^2$ |
| Pb(II) | 298 | 163.9 | 0.085 | 0.319 | 0.964 | 19.64 | 2.10 | 0.981 |
| | 308 | 158.7 | 0.058 | 0.465 | 0.962 | 14.67 | 2.00 | 0.975 |
| | 318 | 129.9 | 0.064 | 0.438 | 0.904 | 12.49 | 1.94 | 0.972 |
| Cd(II) | 298 | 101.0 | 0.121 | 0.292 | 0.976 | 20.39 | 2.92 | 0.989 |
| | 308 | 72.5 | 0.147 | 0.254 | 0.888 | 17.29 | 3.21 | 0.989 |
| | 318 | 63.3 | 0.153 | 0.246 | 0.834 | 15.94 | 3.34 | 0.981 |

TABLE 2

Kinetic data for adsorption of Pb(II) and Cd(II)

| | | Kinetic models | | | | | |
|---|---|---|---|---|---|---|---|
| | | Pseudo-first-order | | | Pseudo-second-order | | |
| Metal ions | $q_{e,exp.}$ (mg/g) | $q_{e,cal.}$ (mg/g) | $k_1$ (1/min) | $R^2$ | $q_{e,cal.}$ (mg/g) | $k_2$ (g/mg-min) | $R^2$ |
| Pb(II) | 42.3 | 163.9 | 0.085 | 0.937 | | 2.10 | 0.981 |
| Cd(II) | 41.2 | 101.0 | 0.121 | 0.929 | 20.39 | 2.92 | 0.989 |

Example 3

Regeneration Experiments and Results

Figure 9A:
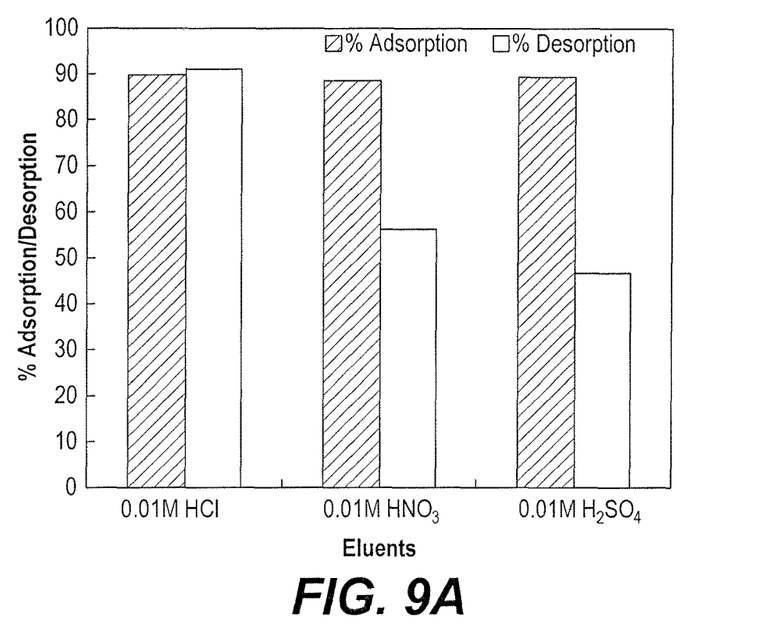
FIG. 9A is a chart showing regeneration of the magnetic polymer nanocomposite saturated with Pb(II) heavy metal ions by elution with 0.01M solutions of hydrochloric acid (HCl), nitric acid ($HNO_3$), and sulfuric acid ($H_2SO_4$), respectively.
Figure 9B:
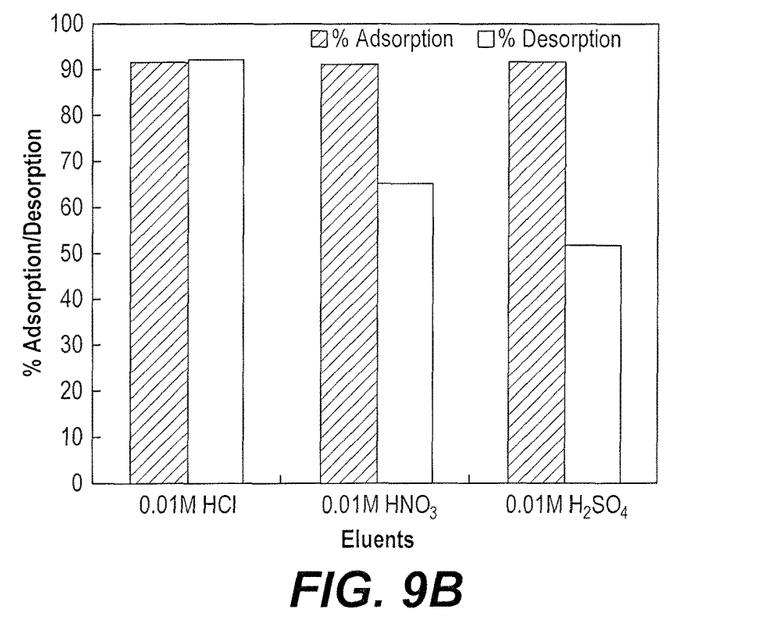
FIG. 9B is a chart showing regeneration of the magnetic polymer nanocomposite saturated with Cd(II) heavy metal ions by elution with 0.01M solutions of hydrochloric acid (HCl), nitric acid ($HNO_3$), and sulfuric acid ($H_2SO_4$), respectively.

Pb(II) and Cd(II) ions were desorbed from saturated Fe$_3$O$_4$@BPHS nanocomposite by elution by a strong acid, such as HCl, H$_2$SO$_4$, or HNO$_3$, in batch mode experiments. Samples of Fe$_3$O$_4$@BPHS, saturated with a divalent heavy metal ion (Pb$^{+2}$ or Cd$^{+2}$) removed from water or aqueous solution as described in Example 2, was treated with a 25 mL 0.01 M solution of one of the various eluents over a thermostatic shaker assembly shaken at 100 rpm for 24 hr to ensure complete elution of the adsorbed heavy metal ions by the acid. The solid and solution phases of the resulting mixture were magnetically separated, and the eluted heavy metal ions concentration was quantitatively determined by atomic absorption spectroscopy (AAS). The amount of heavy metal ions desorbed was calculated according to equation (3):

$$\% \text{ Desorption} = \frac{C_d}{C_{ia}} \times 100, \quad (4)$$

where $C_d$ is the concentration of the heavy metal ions desorbed by the eluent and $C_{ia}$ is the initial concentration of heavy metal ions adsorbed on the magnetic polymer composite, Fe$_3$O$_4$@BPHS. FIGS. 9A and 9B show the results of eluting the used magnetic polymer nanocomposite with a dilute solution of a strong acid.

An adsorption/desorption scheme of Pb(II) and Cd(II) on Fe$_3$O$_4$@BPHS is shown in FIG. 2 using hydrochloric acid as an example, although 0.1 M nitric acid or 0.1 M sulfuric acid may be used instead of hydrochloric acid, as shown by FIGS. 9A and 9B.

It is to be understood that the magnetic polymer nanocomposite for removal of divalent heavy metal ions from water is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of making a magnetic polymer nanocomposite, comprising the steps of:
    dissolving FeCl$_3$ and FeCl$_2$ separately in HCl to form an Fe(III) solution and an Fe(II) solution, respectively;
    combining the Fe(III) solution and the Fe(II) solution to form a combined solution;
    adding a solution of branched polyhydroxystyrene (BPHS) in methanol and a solution of ammonium hydroxide to the combined solution dropwise to form a mixture; and
    stirring the mixture under nitrogen atmosphere to precipitate the magnetic polymer nanocomposite as Fe$_3$O$_4$ nanoparticles in a BPHS shell (Fe$_3$O$_4$@ BPHS).

2. The method of making a magnetic polymer nanocomposite according to claim 1, further comprising the step of removing the precipitated magnetic polymer nanocomposite by application of an external magnetic field.

3. The method of making a magnetic polymer nanocomposite according to claim 1, wherein said step of adding a solution of branched polyhydroxystyrene (BPHS) in methanol and a solution of ammonium hydroxide to the combined solution dropwise comprises adding a solution of branched polyhydroxystyrene (BPHS) in methanol and a solution of ammonium hydroxide to the combined solution dropwise until a pH of 10 is obtained.

4. The method of making a magnetic polymer nanocomposite according to claim 1, wherein said step of dissolving FeCl$_3$ and FeCl$_2$ separately in HCl to form an Fe(III) solution and an Fe(II) solution further comprises dissolving the FeCl$_2$ in HCl in the presence of a flow of nitrogen gas to prevent oxidation of Fe(II).

5. The method of making a magnetic polymer nanocomposite according to claim 1, wherein said solution of ammonium hydroxide comprises a 28% NH$_4$OH solution.

* * * * *